United States Patent
Belharouak et al.

(10) Patent No.: US 11,664,542 B2
(45) Date of Patent: May 30, 2023

(54) RECOVERY OF MATERIALS FROM ELECTRODE SCRAPS AND SPENT LITHIUM-ION BATTERIES VIA A GREEN SOLVENT-BASED SEPARATION PROCESS

(71) Applicant: UT-Battelle, LLC, Oak Ridge, TN (US)

(72) Inventors: Ilias Belharouak, Oak Ridge, TN (US); Yaocai Bai, Oak Ridge, TN (US); Rachid Essehli, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/551,636

(22) Filed: Dec. 15, 2021

(65) Prior Publication Data

US 2022/0200074 A1 Jun. 23, 2022

Related U.S. Application Data

(60) Provisional application No. 63/126,681, filed on Dec. 17, 2020.

(51) Int. Cl.
*H01M 4/00* (2006.01)
*H01M 10/54* (2006.01)

(52) U.S. Cl.
CPC ................... *H01M 10/54* (2013.01)

(58) Field of Classification Search
CPC ............ H01M 4/04; H01M 4/13; C01G 51/00
See application file for complete search history.

(56) References Cited

FOREIGN PATENT DOCUMENTS

| CN | 103305965 B | * | 8/2016 |
| CN | 110885072 A | * | 3/2020 |
| JP | 2019521485 A | * | 7/2019 |

* cited by examiner

*Primary Examiner* — Cynthia H Kelly
*Assistant Examiner* — Monique M Wills
(74) *Attorney, Agent, or Firm* — Warner Norcross + Judd LLP

(57) ABSTRACT

A method for recycling lithium-ion battery materials is provided. The method includes isolating a composite electrode comprising an electrode material adhered to a current collector with a polyvinylidene difluoride (PVDF) binder. The composite electrode is combined with triethyl phosphate (TEP) as a solvent to form a mixture. The electrode material is delaminated from the current collector in the mixture to give a free electrode material and a free current collector. Each of the free electrode material and the free current collector is recovered from the mixture. The free electrode material may be reused to prepare another composite electrode, as well as a lithium-ion battery comprising the same, which are also disclosed.

18 Claims, No Drawings

RECOVERY OF MATERIALS FROM ELECTRODE SCRAPS AND SPENT LITHIUM-ION BATTERIES VIA A GREEN SOLVENT-BASED SEPARATION PROCESS

CROSS-REFERENCE TO RELATED APPLICATIONS

This application claims the benefit of U.S. Provisional Application 63/126,681, filed Dec. 17, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates generally to battery recycling and, more specifically, to a method of directly recycling spent lithium-ion batteries and electrode scraps by recovering reusable components therefrom.

BACKGROUND OF THE INVENTION

Since their commercialization in the early 1990s, lithium-ion batteries have been widely used to power consumer electronics. Meanwhile, they are gaining increasing popularity in electric vehicles (e.g. electric vehicles (EVs), hybrid vehicles (HVs), plug-in hybrid vehicles (PHVs), etc.) owing to their high-energy density and long cycle life. However, in addition to growing adoption and development of lithium-ion battery-powered technologies, there is an increasing concern of flooding the market with end-of-life batteries. Specifically, estimates projecting that over 11 million metric tons of lithium-ion batteries will approach end-of-life in the decade between 2020-2030. Unfortunately, the vast majority of such end-of-life lithium-ion batteries have historically ended up in landfills, increasing potential risks of contamination to local soil and groundwater and removing useful materials from many electronic supply chains. Despite these mounting concerns, there is still a severe lack of incentive to recycle spent lithium-ion batteries, with estimates indicating that fewer than 5% of all lithium-ion batteries are being recycled at present.

In terms of the economy of recycling, most of the recoverable value in spent lithium-ion batteries is in the cathode, as that component constitutes the major value added in production. As such, state-of-the-art recycling approaches involving pyrometallurgical and hydrometallurgical processes have been increasingly developed and optimized for the recovery of metals from spent cathodes. However, pyrometallurgy is energy-intensive and cannot reclaim lithium, and hydrometallurgy involves caustic reagents (e.g. hydrochloric and nitric acids) and requires complicated purification and separation steps.

Direct recycling has recently been proposed in attempts to recover cathode materials with still-useful morphology and preserved chemical structures. Specifically, direct recycling processes aim to maintain the morphology of the recovered electrode materials to save efforts involved with subsequent regeneration processes, while also minimizing impurities (e.g. from current collectors and side reaction products) to circumvent both complex separation processes and contamination of the re-usable active materials being recovered. It will be appreciated that such an approach has the possibility to lower the overall number of recycling steps preceding new cell manufacturing, thereby reducing energy consumption (and hence, battery cost) while also alleviating environmental impacts by reducing greenhouse gas and SOx emissions.

Unfortunately, efficiently separating electrode materials from adjacent current collectors represents a major challenge for direct recycling and the metallurgical processes above. Specifically, an adhesive binder is typically employed between electrode films and current collectors in order to achieve longer cycle life and higher energy densities and increase long-term stability of the batteries. One such binder employed for these purposes is polyvinylidene difluoride (PVDF), which is a highly non-reactive thermoplastic fluoropolymer prepared by polymerization of vinylidene difluoride (i.e., 1,2-difluoroethylene). PVDF is one of the most common binders used for cathodes of lithium ion batteries due to its superior electrochemical and thermal stability and excellent adhesion between current collectors and electrode films. Unfortunately, these same properties (i.e., strong adhesion coupled with high resistance to solvents, acids, and hydrocarbons) increase the difficulty and complexity of recycling batteries using such composite electrodes by necessitating inefficient and energy intensive pre-treatment steps to separate the electrode components. However, this pretreatment is important for improving the recycling efficiency, as well as for reducing the energy consumption associated with the subsequent separation processes.

With regard to direct recycling in particular, workable separation process are even more limited due to the necessary preservation of active materials being recovered. As such, several approaches have recently attempted, but ultimately failed, to meet the requirements for direct cathode recycling. For example, high-temperature thermal treatments effectively decompose PVDF, but affect both the crystal structure and the morphology of the active materials, while also releasing hydrogen fluoride (HF). Another separation approach involves dissolving PVDF with an organic solvent. However, owing to the nature of PVDF described above, commonly available solvents that are capable of dissolving PVDF under workable conditions, such as N-methyl-2-pyrrolidone (NMP) and N,N-dimethylformamide (DMF), are volatile and toxic and thus limited with regard to scale-up. Other reaction media, such as $AlCl_3$—NaCl molten salt and deep eutectic choline chloride/glycerol solvents have also been investigated, but failed to effectuate a useful separation of cathode materials from aluminum foils without altering both the morphology and composition of the recovered cathode materials.

As such, while direct recycling processes remain promising in terms of potential recycling process capable of wide-spread adoption (e.g. to mitigate and manage the growing number of end-of-life packs and cells, and recover valuable materials there from), there remains significant challenges to the initial separation of composite electrodes in order to recover re-usable components therefrom in a cost-effective and environmentally friendly manner.

SUMMARY OF THE INVENTION

A method of recycling lithium-ion batteries is provided. The method is useful for recovering re-usable components, in particular components of composite electrodes, from spent lithium-ion batteries, as well as recovering components from composite electrode scraps obtained during production of composite electrodes. The method includes isolating a composite electrode comprising an electrode material adhered to a current collector with a polyvinylidene difluoride (PVDF) binder. The method further includes combining the composite electrode with triethyl phosphate (TEP) as a solvent to form a mixture. The method further includes delaminating the electrode material from the current collector in the mixture to give a free electrode material and a free current collector. The method also includes recovering each of the free electrode material and the free current collector from the mixture.

The method provides a highly efficient, cost-effective, and environmentally sustainable separation process that enables direct recycling of lithium-ion battery materials. In some embodiments, the step of isolating the composite electrode may include separating the composite electrode from one or more other components of the lithium-ion battery and/or washing the composite electrode to remove a residual electrolyte therefrom. In certain embodiments, the composite electrodes may be washed with organic solvents such as but not limited to dimethyl carbonate and diethyl carbonate.

In some embodiments, the composite electrode may be one or both of a spent electrode from a spent lithium-ion battery and electrode scrap from an electrode manufacturing process. In certain embodiments, the composite electrode may be further defined as a composite cathode, and the electrode material may be further defined as a cathode active material. In the composite cathode, the cathode active material may comprise a lithium-bearing metal oxide and/or the current collector may comprise aluminum.

In some embodiments, the method may further include the step of shredding the composite electrode into a collection of smaller composite electrode fragments before the step of combining the composite electrode with TEP. In some embodiments, the mixture of composite electrode and TEP may have a solid-to-liquid ratio ranging from 1:10 wt./wt. to 1:2 wt./wt., based on the weights of the composite electrode and the TEP solvent.

In some embodiments, the step of delaminating the electrode material from the current collector may include heating the mixture to a temperature in the range of 20° C. to 215° C. and stirring the mixture. In certain embodiments, the stirring may be conducted for a time of 5 to 300 minutes. In some embodiments, the step of delaminating the electrode material from the current collector may include heating the mixture to a temperature of in the range of 20° C. to 215° C. and stirring the mixture, and subsequently subjecting the mixture to sonication. In certain embodiments, the stirring may be conducted for a time of at least 30 minutes, and the sonication may be conducted for a time of at least 30 minutes.

In some embodiments, the step of recovering each of the free electrode material and the free current collector from the mixture may include sieving the mixture, subjecting the mixture to filtration and centrifugation, rinsing the at least one of the free electrode material and the free current collector, and/or drying the at least one of the free electrode material and the free current collector. The free electrode material recovered from the mixture may have substantially the same morphology as the electrode material, substantially the same chemical composition as the electrode material, and/or substantially the same electrochemical performance as the electrode material. The recovered free electrode material may also be directly reusable in the preparation of a new composite electrode. The free current collector recovered from the mixture may be substantially free from corrosion and/or residual electrode material.

In some embodiments, the method may further include the step of recovering the PVDF binder from the mixture. In certain embodiments, the PVDF binder may be recovered by non-solvent induced phase separation (NIPS).

In some embodiments, the method may further include preparing a new composite electrode using the free electrode material. Additionally, the method may include preparing a new lithium-ion battery using the new composite electrode.

These and other features of the invention will be more fully understood and appreciated by reference to the description of the embodiments, when viewed in accordance with the accompanying examples and the appended claims.

DETAILED DESCRIPTION OF THE CURRENT EMBODIMENTS

A method of recycling lithium-ion batteries is provided. As described herein, the method provides a direct recycling process, and thus may be used to recover certain components of lithium-ion batteries with intact chemical structures. The recovered components may then be reused, e.g. by preparing new components and/or new batteries therewith, thus driving down the overall production cost of preparing new batteries. As described below, the method enables an economic and more environmentally-friendly recovery of materials from spent lithium-ion batteries compared to conventional recycling methods, by using triethyl phosphate (TEP), which is not carcinogenic, teratogenic, or mutagenic, and is much safer, less toxic, and more environmentally friendly than NMP and DMF. TEP effectively separates the black mass from metal foils without any deterioration on either part and with nearly 100% dissolution of the binder used in the coating of the electrode materials.

In general, the method comprises separating electrode material from current collectors in isolated composite electrodes. As understood by those of skill in the art, a primary challenge for enabling direct recycling is separating electrode materials or black mass from the current collectors in a manner that is efficient, economical, and results in minimal or no changes to the chemical structure (e.g. morphology, composition, etc.) of both the electrode material (e.g. black mass) and the current collectors. The high stability and strong bonding capability of the organic binders utilized in typical lithium-ion batteries make it difficult to separate the electrode materials from the current collectors. As such, conventional processes for separating these components exhibit high energy consumption, low peeling-off efficiency, and produce numerous byproducts that increase environmental pollution loads. Comparatively, as described in the exemplary embodiments and demonstrated in the example herein, the current method possesses a high peeling-off efficiency, uses cost-effective materials and techniques, and is both energy efficient and environmentally friendly.

More particularly, the method includes isolating a composite electrode comprising an electrode material adhered to a current collector; combining the isolated composite electrode with TEP to form a mixture; delaminating the electrode material from the current collector in the mixture to give a free electrode material and a free current collector; and recovering each of the free electrode material and the free current collector from the mixture. The details of these steps of the method are described in detail below.

As will be appreciated in view of the description and examples herein, the scope of lithium-ion batteries suitable for use in the method is not especially limited, and particular such batteries will be selected by one of skill in the art in view of the particular embodiments exemplified herein, limited only by the requirements of certain components and/or composition features (e.g. such as the inclusion of a composite electrode suitable for use in the method processes described below). In general, lithium-ion batteries comprise common components, which typically include a shell or case (or "shell casing"), electrodes for storing lithium ions (e.g. a cathode electrode and an anode electrode) disposed within the shell, a separator disposed between the electrodes, and an organic electrolyte suitable for carrying the lithium ions between the electrodes through the separator. The lithium-ion batteries may be manufactured as or otherwise utilized in any particular form or type of battery, such as a coin cell (e.g. CR2032), a pouch cell, a cylindrical cell, or a combination thereof. For example, a plurality of lithium-ion batteries may be arranged in the form of a battery pack.

Regarding the battery components, the shell may include or be formed from any material known in the art for lithium-ion batteries. Typically, the shell includes a plastic material, a metal-containing material, or a combination thereof. In some embodiments, exemplary shells typically consist essentially of a single material component and are substantially homogeneous in composition. Examples of such materials include stainless steels, nickel-plated steels, and plastic-metal composites (e.g. aluminum-plastic compositions, laminates, etc.).

The separator of suitable lithium-ion batteries is not particularly limited, as will be understood in view of the description below. As such, any separator suitable for use in a lithium-ion battery can theoretically be utilized, with particular separators being selectable for use in view of the other battery components by one of skill in the art (e.g. to provide a low resistance against ion migration of the electrolyte, excellent electrolyte solution-wetting ability, etc.). General examples of such materials are selected from glass fiber, polyester, Teflon, polyolefins (e.g. polyethylene (PE), polypropylene (PP), polytetrafluoroethylene (PTFE), etc.), and various combinations thereof, and may be utilized in a form of a nonwoven or woven fabric. Specific examples of separators typically include porous membranes comprising PE, PP, or PE/PP copolymers, which are generally unreactive with organic solvents and thus suitable for safe use with the other battery components.

The electrolyte is also not particularly limited in terms of the method, and thus suitable lithium-ion batteries may generally include any electrolyte solution or composition suitable for use in a lithium-ion battery. General examples of such electrolyte compositions generally include various liquid electrolytes and solid electrolytes. Example of liquid electrolytes typically include electrolyte salts (e.g. lithium salts, such as $LiPF_6$, $LiBF_4$, $LiCF_3SO_3$, $Li(SO_2CF_3)_2$, $LiClO_4$, etc.) in an organic solvent (e.g. alkyl carbonates, such as ethylene carbonate, dimethyl carbonate, diethyl carbonate, etc.).

The electrodes of lithium-ion batteries suitable for the method typically include an electrode material adhered to a current collector with an organic binder. The particular electrode material and current collector will be selected based on the use of the particular electrode. i.e., as a cathode electrode ("cathode") or an anode electrode ("anode") in the battery utilized.

In some embodiments, the composite electrode is further defined as a composite cathode. In such embodiments, the electrode material is further defined as a cathode active material. It will be appreciated that, as a component of the lithium-ion battery being recycled, the cathode active material typically comprises a lithium-bearing metal oxide. Examples of such compounds include $LiCoO_2$, $LiMn_2O_4$, $LiNiO_2$, $LiCrO_2$, $LiFePO_4$, $LiNiO_2$, $Li\ Mn_2O_4$, $LiV_2O_5$, $LiTiS_2$, $LiMoS_2$, $LiMnO_2$, as well as variations of lithium nickel oxides, lithium nickel manganese oxides, lithium nickel manganese cobalt oxides, and the like, exemplified by those having general formulas such as $LiNi_xMn_yO_2$, $Li_{1-z}Ni_xMn_yCo_{1-x-y}O_2$, $LiNi_xCo_yAl_z)_2$, $LiNi_xCo_yMn_zO_2$, etc., where each x, y, and z is typically a mole fraction of from 0 to 1, where x+y+z=1. Such materials are known in the art, and will be readily selected by those of skill in the art. The cathode active material may also comprise a conductive agent, e.g. for enhancing the electron conductivity of the cathode active material.

In general, the composite electrode includes a binder, such as an organic binder, to adhere together the active components thereof (e.g. the conductive materials, conductive agents, etc.), as well as to adhere the electrode material to the adjacent current collector. In the present embodiments, the organic binder is typically a polyvinylidene fluoride (PVDF)-based binder ("PVDF binder"), as will be best understood in view of the entire description and the examples herein. Examples of such PVDF binders generally include, either as a homopolymeric composition, as a copolymer or interpolymer of PVDF and one or more other monomers, or a multi-polymer composition comprising a PVDF homo- or copolymer with one or more other polymers. Such PVDF binders are known in the art, and will be readily selected by those of skill in the art in consideration of preparing the electrode materials and composite electrodes described herein. Examples of particular PVDF binders may include various combinations of polyvinylidene fluorides, polytetrafluoroethylenes, fluorinated ethylene-propylene copolymers (e.g. from tetrafluoroethylene and/or hexafluoropropylene, etc.), and various per- or polyfluoroalkoxy polymers. One of skill in the art will appreciate that, while PVDF is exemplified herein, other similar binders to those above, even some that are substantially free from, alternatively are free from PVDF, may also work as intended when utilized in the method.

The current collectors of suitable lithium-ion batteries are not particularly limited, as will be understood in view of the description below. In general, any current collector suitable for use in a lithium-ion battery can theoretically be utilized, with a particular current collector being selectable for use in view of the other battery components (i.e., the other electrode components, such as the binder and active materials thereof) by one of skill in the art. Examples of suitable current collectors generally include materials including aluminum, copper, nickel, titanium, stainless steel, and even some carbonaceous materials. The current collector may be in any form known in the art, such as plates, sheets, foils, etc. Such terms may be overlapping in scope, as the current collector may have any thickness that is suitable for carrying a current, but will typically be selected with a minimal thickness in order to maximize energy density. Other materials and structures, as well as specific treatments (e.g. etching, coating, etc.) may be utilized to enhance the electrochemical stability and electrical conductivity of current collectors; however, it will be appreciated that not all composite current collectors may be suitable for use in the method in all circumstances, as the conditions and materials may be optimized for homogeneous metallic current collectors. In certain embodiments, the lithium-ion battery includes a cathode having an aluminum current collector. In specific embodiments, the cathode current collector is an aluminum sheet or foil.

As introduced above, the method includes isolating the composite electrode from a spent lithium-ion battery. Typically, the method includes discharging the lithium-ion battery before further processing, i.e., to remove any remaining charge stored therein. In this fashion, the term "spent" is used herein to refer to a discharged battery, and is not necessarily limited to an end-of-life or fully discharged battery.

Techniques for discharging are not limited, and are exemplified by soaking the battery in an aqueous solution (e.g. neutral or alkaline) containing a conducting salt (e.g. $NaHCO_3$, $KHCO_3$, $Na_2CO_3$, $K_2CO_3$, $CaCO_3$, $MgCO_3$, NaOH, KOH, $Ca(OH)_2$, $Mg(OH)_2$, NaCl, $CaCl_2$, and the like, or combinations thereof). In some embodiments, the shell of the battery may be punctured (e.g. via piercing, cutting, etc.) before soaking in the aqueous solution for discharge.

Once the battery is discharged, isolating the composite electrode generally includes dismantling the battery and separating the composite electrode from the other battery components, such as the shell, electrolyte, separator, etc. The isolation process is not limited, and may be carried out in various fashions with any technique meeting the limitations of the embodiments described herein. For example, isolation techniques will typically be selected in view of the aim of the direct recycling, that is to not damage, destroy, or otherwise render the composite electrode less usable than in the native state prior to isolation.

In certain embodiments, the spent lithium-ion battery is chopped, cut, or shredded into smaller pieces (e.g. via manually or computer-monitored saw/blade cutting, shredder, etc.). The pieces may be sized for homogeneity, increased surface area, processing capabilities of the particular equipment utilized, etc.

In some embodiments, the method further includes washing the composite electrode. In such embodiments, the composite electrode is typically washed with an organic solvent such as dimethyl carbonate that is unreactive with the composite electrode and also capable of removing any residual amount of electrolyte or particular matter from the composite electrode prior to combining the composite electrode with TEP as described below.

As introduced above, the method includes combining the isolated composite electrode with TEP to form a mixture. Any amount of TEP solvent may be utilized, the amount being selected based on the size of the separation being carried out, the amount of one component to be utilized, etc. However, in some embodiments, the mixture may have a solid-to-liquid ratio ranging from 1:10 wt./wt. to 1:2 wt./wt., based on the weights of the composite electrode and the TEP solvent.

The TEP solvent in the mixture dissolves the binder present in the composite electrode and thereby provides for the delamination of the electrode material from the current collector in the mixture to give a free electrode material and a free current collector. The delaminating may be carried out by any means suitable for separating the electrode material and the current collector from one another. In general, once the mixture has been formed, delaminating the composite electrode simply requires mechanically separating the electrode material and the current collector from one another. As such, specific techniques such as peeling, or more general processes such as agitation (e.g. via stirring, shaking, tumbling, sonication, vortexing, etc.) may be utilized. In some embodiments, delaminating the electrode material from the current collector includes mechanically agitating the mixture, e.g. with a stirrer, stir bar, etc., or by subjecting the mixture to sonication. In certain embodiments, the mixture is heated to a temperature of approximately 20 to 215° C. during the delamination step. In such embodiments, the temperature of the TEP solvent may impact the effectiveness and/or rate at which the binder present in the electrode material is released from the current collector. The TEP solvent is capable of fully delaminating the electrode material from the current collector within a time of 60 minutes after forming the mixture.

Once delaminated, the components of the method are typically isolated or otherwise separated from each other. In particular, the free electrode material and the free current collector are recovered from the heterogeneous mixture including the citrate-based solvent. In some embodiments, the method includes sieving and/or filtering the mixture to extract at least one of the free electrode material and the free current collector. In some embodiments, the method also includes rinsing the free electrode material and/or the free current collector with a different solvent and/or drying to remove a residual amount of TEP therefrom.

As introduced above, the method may be utilized in direct recycling, such that the components recovered from the battery may be reused. For example, in some embodiments, the free electrode material recovered from the mixture comprises substantially the same morphology as the initial electrode material. In these or other embodiments, the free electrode material recovered from the mixture has substantially the same chemical composition as the initial electrode material. In these or other embodiments, the free electrode material recovered from the mixture has substantially the same electrochemical performance as the initial electrode material. In some embodiments, the free electrode material recovered from the mixture is directly reusable in the preparation of a new composite electrode. However, it will be appreciated that the free electrode material may also be processed in numerous ways prior to such use or any final application.

In some embodiments, the free current collector recovered from the mixture is substantially free from corrosion. In these or other embodiments, the free current collector recovered from the mixture is substantially free from residual electrode material.

In some embodiments, the method further includes preparing a new composite electrode using the free electrode material. In some such embodiments, the method further includes preparing a new lithium-ion battery using the new composite electrode. In this fashion, the composite electrode may be reused, and thus that component of the battery recycled, once recovered. Similarly, in certain embodiments, the free current collector is reused to prepare a new composite electrode and/or a new battery.

Examples

The TEP separation process is further described in connection with the following laboratory examples, which are intended to be non-limiting.

Cathode scraps of NMC622 were treated in TEP at 100° C. for 1 hour. The recovered aluminum foil pieces had a shiny glare, indicating no observable corrosion on the aluminum. The removal of PVDF binder in the recovered cathode powder was confirmed by FTIR spectra. The characteristic peaks of pristine PVDF at 1,400, 1,180, and 870 $cm^{-1}$, which are attributed to the bending vibration of $CH_2$, symmetrical stretching of $CF_2$, and out-of-plane bending vibration of $CH_2$, respectively, are clearly distinguished in the cathode scraps. Those IR bands disappeared for the recovered cathode powder, suggesting that no detectable PVDF binder was present in the recovered cathode powder. Thermogravimetric analysis (TGA) was performed to monitor the fraction of different components in the recovered cathode powder. Two major weight losses, which are associated with the thermal decomposition of PVDF at ~350° C. and the removal of carbon black at ~550° C., were observed. The amount of PVDF binder in the recovered sample was determined to be 0.41 wt %, which was dramatically reduced from 5 wt % in the cathode scraps. In addition, the amount of carbon black additive decreased from 5 wt % to 1.79 wt %. It was observed that some of the carbon black particles remained dispersed in the TEP solvent during the centrifugation process.

The morphology of the cathode scraps and the recovered cathode particles were characterized by SEM. The NMC622 cathode scraps were composed of NMC622 secondary particles and carbon black nanoparticles that were bonded by PVDF binder. The size of the secondary particles ranged from several to tens of micrometers with primary particles being hundreds of nanometers. After the TEP-based separation process, the reclaimed microparticles displayed identical morphologies and sizes as the cathode scraps, emphasizing that this solvent-based process does not destroy the active materials, which is especially important for the direct recycling approach. Small aggregates of particles in matrix of carbon black and binder were observed in the recovered cathode powder, which is consistent with the TGA result.

X-ray diffraction patterns for NMC622 cathode scraps and the reclaimed cathode powder indicated that all the diffraction peaks can be indexed with the layered rhombohedral structure of $\alpha$—$NaFeO_2$. Furthermore, the XRD patterns were nearly identical and no impurity phases were observed, suggesting that the TEP-based separation process was benign and did not deteriorate the crystal structure. The benign nature of this process was also demonstrated by the compositional analysis through ICP-OES characterization. Both the molar ratios of lithium and those of the transition metals remained unchanged for the samples before and after separation, indicating that no metal leaching occurred during the separation process.

The electrochemical performance of the recovered NMC622 powder was evaluated in half coin cells. Both baseline and recovered NMC622 electrodes consisted of 90 wt % of active material, 5 wt % of carbon black and 5 wt % of PVDF binder. Similar charge-discharge curves at C/10 were exhibited for both the baseline and the recovered electrode. The reversible discharge capacities at C/10 are 186.5 mAh/g for the baseline and 177.4 mAh/g for the recovered sample. The recovered NMC622 can maintain 95.5% of the baseline capacity, suggesting that the separation process does not significantly affect the electrochemical performance of the recovered cathode. The cycle performance for the baseline and the recovered sample indicated that the two samples exhibit a similar capacity retention of ~97% after 30 cycles at 1C/1C charge/discharge rates, further emphasizing the insignificant effect of the TEP-based separation process on the electrochemical performance.

In addition to the reclamation of cathode powder, recovery of other composite electrode materials such as the current collector and/or binder may expand the recycling margins. The SEM image for the recovered aluminum foil current collector revealed that no particles were present on the surface of the aluminum foil, confirming the successful separation of cathode materials from the current collector with a high peeling-off efficiency. Unlike high-temperature heat treatment, which decomposes the organic PVDF binder and produces toxic HF gas, the TEP-based separation process recovers PVDF binder, as well, further expanding the recycling revenue. After separation of the active cathode particles through filtration and centrifugation, the supernatant consisted of PVDF and carbon black particles in the TEP solvent. PVDF binder was recovered through a non-solvent induced phase separation (NIPS) process. By adding non-solvent such as water to the supernatant, phase separation occurred in which PVDF polymer precipitated out along with the residual carbon black particles. The FTIR spectrum of pristine PVDF and that of recovered PVDF showed that the IR bands matched well with each other.

In addition to recycling cathode scraps, spent lithium-ion pouch cells consisting of NMC622 cathode and graphite anode were generated by aging lithium-ion pouch cells at 1C/1C charge/discharge rates for 1000 cycles. After discharging and dismantling, spent NMC622 cathode was manually separated and cut into 1 cm by 1 cm pieces. In contrast to the recycling of cathode scraps, which requires stirring during the recovery process, the separation for spent cathode involves different reaction parameters. For cathode scraps, the coated materials on aluminum foil were gradually dispersed in TEP at a relatively low temperature (e.g. 100° C.) under stirring. However, the same reaction parameters failed to separate spent cathode materials from Al foils. It was found that the cathode coatings would first delaminate from Al foils as the heating temperature was increased to 150° C. The cathode films were obtained in less than 5 min. The subsequent mechanical stirring, however, could not separate spent cathode materials from PVDF. Mechanical stirring broke the large delaminated cathode films into smaller pieces without separating active cathode particles from PVDF binder. SEM imagery showed that the morphology of the recovered cathode materials under mechanical stirring alone was similar to that of the spent cathode, further suggesting that mechanical stirring alone cannot remove PVDF from spent cathode. Cathode scraps are different from spent cathode because they are not in contact with electrolyte and do not suffer charge/discharge aging cycles. A cathode electrolyte interface (CEI) layer is formed on the spent cathode. As a result, the dissolution of PVDF binder in TEP is greatly decelerated. To overcome that challenge, sonication was introduced to facilitate the recovery process and to produce cathode powder. The delaminated cathode films were treated alternatively by heating/stirring and bath sonication for 30 min. Subsequent SEM images of the samples revealed dispersed cathode particles, suggesting the successful removal of PVDF binder through a combination of stirring and sonication.

In summary, a green solvent, TEP, was demonstrated to successfully separate cathode materials from aluminum foils for the recycling of both cathode scraps and spent cathode. The reclaimed cathode materials from cathode scraps showed similar crystal structure, morphology, and electrochemical performance compared with the pristine cathode materials. Additionally, other materials such as aluminum foil and PVDF binder were successfully recovered to further expand the recycling revenue. In contrast to mechanical stirring alone in recycling cathode scraps, a combined process of mechanical stirring and sonication was necessary for the separation and recovery of cathode powder from spent LIB s. The TEP-based separation approach thereby may provide for the sustainable recycling of LIBs.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of recycling lithium-ion battery materials, the method comprising:
    isolating a composite electrode, the composite electrode comprising an electrode material adhered to a current collector with a polyvinylidene difluoride (PVDF) binder;
    combining the composite electrode with triethyl phosphate (TEP) as a solvent to form a mixture, wherein the mixture comprises a solid-to-liquid ratio ranging from 1:10 to 1:2 based on the weights of the composite electrode and the TEP solvent;
    delaminating the electrode material from the current collector in the mixture to give a free electrode material and a free current collector; and
    recovering each of the free electrode material and the free current collector from the mixture.

2. The method of claim 1, wherein the composite electrode is further defined as a composite cathode, and the electrode material is further defined as a cathode active material.

3. The method of claim 2, wherein in the composite cathode: (i) the cathode active material comprises a lithium-bearing metal oxide; (ii) the current collector comprises aluminum; or (iii) both (i) and (ii).

4. The method of claim 2, wherein the composite cathode is one or both of a spent cathode from a spent lithium-ion battery and cathode scrap from a cathode manufacturing process.

5. The method of claim 1, wherein isolating the composite electrode comprises: (i) separating the composite electrode from one or more other components of the lithium-ion battery; (ii) washing the composite electrode to remove a residual electrolyte therefrom; or (iii) both (i) and (ii).

6. The method of claim 5, wherein the composite electrodes are washed with an organic solvent.

7. The method of claim 1, further comprising the step of shredding the composite electrode into a collection of smaller composite electrode fragments before the step of combining the composite electrode with TEP.

8. The method of claim 1, wherein the step of delaminating the electrode material from the current collector includes heating the mixture to a temperature in the range of 20° C. to 215° C. and stirring the mixture.

9. The method of claim 8, wherein the stirring is conducted for a time of 5 to 300 minutes.

10. The method of claim 1, wherein the step of delaminating the electrode material from the current collector includes heating the mixture to a temperature of in the range of 20° C. to 215° C. and stirring the mixture, and subsequently subjecting the mixture to sonication.

11. The method of claim 10, wherein the stirring is conducted for a time of at least 30 minutes, and the sonication is conducted for a time of at least 30 minutes.

12. The method of claim 1, wherein recovering each of the free electrode material and the free current collector from the mixture comprises one or more of: (i) sieving the mixture; (ii) subjecting the mixture to filtration and centrifugation; (iii) rinsing at least one of the free electrode material and the free current collector; and (iv) drying at least one of the free electrode material and the free current collector.

13. The method of claim 1, wherein the free electrode material recovered from the mixture: (i) comprises the same morphology as the electrode material; (ii) comprises the same chemical composition as the electrode material; (iii) comprises the same electrochemical performance as the electrode material; (iv) is directly reusable in the preparation of a new composite electrode; or (v) any combination of (i)-(iv).

14. The method of claim 1, wherein the free current collector recovered from the mixture is substantially free from: (i) corrosion; (ii) residual electrode material; or (iii) both (i) and (ii).

15. The method of claim 1, further comprising the step of recovering the PVDF binder from the mixture.

16. The method of claim 15, wherein the PVDF binder is recovered by non-solvent induced phase separation (NIPS).

17. The method of claim 1, further comprising preparing a new composite electrode by coating the free electrode material on a current collector.

18. The method of claim 17, further comprising preparing a new lithium-ion battery by including the new composite electrode in the lithium-ion battery.

* * * * *